US009519456B2

(12) United States Patent
Lutz et al.

(10) Patent No.: US 9,519,456 B2
(45) Date of Patent: Dec. 13, 2016

(54) DATA PROCESSING APPARATUS AND METHOD FOR PERFORMING A SHIFT FUNCTION ON A BINARY NUMBER

(71) Applicant: ARM LIMITED, Cambridge (GB)

(72) Inventors: David Raymond Lutz, Austin, TX (US); Neil Burgess, Austin, TX (US)

(73) Assignee: ARM Limited, Cambridge (GB)

( * ) Notice: Subject to any disclaimer, the term of this patent is extended or adjusted under 35 U.S.C. 154(b) by 349 days.

(21) Appl. No.: 14/210,609

(22) Filed: Mar. 14, 2014

(65) Prior Publication Data

US 2015/0261498 A1    Sep. 17, 2015

(51) Int. Cl.
G06F 5/01 (2006.01)
G06F 7/74 (2006.01)

(52) U.S. Cl.
CPC ............... G06F 5/01 (2013.01); G06F 5/012 (2013.01); G06F 7/74 (2013.01)

(58) Field of Classification Search
None
See application file for complete search history.

(56) References Cited

U.S. PATENT DOCUMENTS 5,633,819 A  5/1997 Brashears et al.
6,499,044 B1 * 12/2002 Brooks ............... G06F 7/49
                                                                     708/205

FOREIGN PATENT DOCUMENTS

GB    2521463    6/2015

OTHER PUBLICATIONS

Antelo et al., "A Novel Design of a Two Operand Normalization Circuit", *IEEE Transactions on Very Large Scale Integration (VLSI) Systems*, vol. 6, No. 1, Mar. 1998, pp. 173-176.
GB Search Report issued Jul. 28, 2015 in GB 1502188.4, 3 pages.
A. Verma et al, "Hybrid LZA: A Near Optimal Implementation of the Leading Zero Anticipator" Asia and South Pacific Design Automation Conference, IEEE, Jan. 2009, pp. 203-209.

* cited by examiner

*Primary Examiner* — Michael D Yaary
(74) *Attorney, Agent, or Firm* — Nixon & Vanderhye P.C.

(57) ABSTRACT

A data processing apparatus and method are provided for performing a shift function on a binary number. The apparatus comprises count determination circuitry for determining a number of contiguous bit positions in the binary number that have a predetermined bit value, the count determination circuitry outputting a count value indicative of the number of contiguous bit positions determined. In parallel with the operation of the count determination circuitry, coarse shifting circuitry is used to determine, for at least one predetermined number of contiguous bit positions, whether that predetermined number of contiguous bit positions within the binary number has said predetermined bit value. An initial shift operation is then performed on the binary number based on that determination in order to produce an intermediate binary number. Once the count value is available from the count determination circuitry, fine shifting circuitry then performs a further shift operation on the intermediate binary number, based on the count value output by the count determination circuitry, in order to produce the result binary number. This provides an efficient mechanism for performing a shift function on a binary number, while still capturing the count value from the count determination circuitry.

16 Claims, 5 Drawing Sheets

DATA PROCESSING APPARATUS AND METHOD FOR PERFORMING A SHIFT FUNCTION ON A BINARY NUMBER

BACKGROUND

The present invention relates to a data processing apparatus and method for performing a shift function on a binary number.

There are many processing operations within a data processing system where it is necessary to perform a shift function on a binary number. For example, it may be desired to shift the binary number in order to shift out a number of leading zeros in the binary number such that, following the performance of the shift function, the resultant binary number has a logic one value in the most significant bit position. One particular situation where such a shift function may be used is during the normalisation of a floating point number. As will be understood, a floating point number is usually expressed by a sign bit, an exponent value and a fraction value. For a normal floating point number, the significand is given by 1.F (F representing the fractional part (the above-mentioned "fraction value") of the floating point number), and accordingly for normal floating point numbers the most significant bit of the significand is already a logic one value, and accordingly this significand is normalised. However, if the floating point number is in a subnormal range (as indicated by the exponent having a predetermined value), then the significand of the floating point number is 0.F, and accordingly the most significant bit of the significand is 0. Prior to performing operations using such a subnormal floating point number, it is often the case that the floating point number will be normalised by performing a left shift operation on the significand in order to remove all of the leading 0 values, and by then adjusting the exponent value accordingly.

In order to be able to perform a shift function on a binary number, it is necessary to determine the number of leading 0 values in the input binary number, in order to determine the amount of left shift required in order to remove those leading 0 values. There are a number of count-leading zero (CLZ) circuits available which count the number of 0s in a binary number that precede the highest order 1 in that number, and then generate a leading zero count (LZC) indicative of the number of leading 0s.

However, the shift function cannot be performed until the leading zero count is available to identify the amount of shifting required, and this can introduce some significant performance constraints in some situations.

The paper "A Novel Design of a Two Operand Normalisation Circuit" by Antelo et al, IEEE Transactions on Very Large Scale Integration (VLSI) Systems, Volume 6, Number 1, March 1998, pages 173-176, describes a technique for incorporating the shifting functionality into a counting leading zero operation. However, whilst such an approach can improve the speed of the shift operation, there are various situations where such an approach is impractical. For example, there are many situations where the leading zero count is also required quickly due to it being needed for other purposes, other than for performing the shift function. For example, in the earlier discussed example of floating point numbers, the leading zero count is also required as soon as possible so that the exponent logic can adjust the exponent of the floating point number based on the shift being performed in respect of the significand. The above approach does not produce the leading zero count as quickly as would be desired in such situations.

Accordingly, it would be desirable to provide an improved technique for performing a shift function on a binary number, whilst also improving the speed of generating a count value indicative of a number of contiguous bit positions in the binary number having a predetermined bit value, for example the number of leading 0 bit values in the binary number.

SUMMARY

Viewed from a first aspect, the present invention provides a data processing apparatus for performing a shift function on a binary number, comprising: count determination circuitry configured to determine a number of contiguous bit positions in the binary number having a predetermined bit value, and to output a count value indicative of said number of contiguous bit positions; coarse shifting circuitry configured to determine, for at least one predetermined number of contiguous bit positions, whether said predetermined number of contiguous bit positions within the binary number has said predetermined bit value, and to perform an initial shift operation on the binary number based on said determination in order to produce an intermediate binary number, said coarse shifting circuitry operating in parallel with said count determination circuitry; and fine shifting circuitry configured to perform a further shift operation on the intermediate binary number, based on the count value output by the count determination circuitry, in order to produce a result binary number.

In accordance with the present invention, the shift function is split into two parts, implemented by coarse shifting circuitry and fine shifting circuitry. The coarse shifting circuitry operates in parallel with count determination circuitry used to produce a count value indicative of the number of contiguous bit positions in the binary number having a predetermined bit value, and operates without knowledge of that count value. Instead, the coarse shifting circuitry determines whether a predetermined number of contiguous bit positions within the binary number have the predetermined bit value (in some embodiments it may in fact perform this determination for multiple different predetermined numbers of contiguous bit positions), and then performs an initial shift operation on the binary number based on that determination in order to produce an intermediate binary number.

Fine shifting circuitry then performs any additional shifting required over and above the initial shift operation, once the actual count value is available from the count determination circuitry. This enables the shift function to be applied more quickly than would be the case if the shift function was only performed once the count value was available, whilst still enabling the count value to be quickly and separately captured, and hence available without delay for reference by any other components within the data processing apparatus that need to utilise that count value.

In one embodiment, the count determination circuitry is configured to determine the number of contiguous bit positions in the binary number having said predetermined bit value, starting from a first end of the binary number, and the coarse shifting circuitry is configured to determine whether said predetermined number of contiguous bit positions within the binary number has said predetermined bit value, starting from said first end.

Whilst in one embodiment the coarse shifting circuitry may only perform a determination in respect of one predetermined number of contiguous bit positions, in another embodiment the coarse shifting circuitry performs such determination for a set of multiple different predetermined numbers of contiguous bit positions. If a plurality of those different predetermined numbers of contiguous bit positions have the predetermined bit value, then the largest one is selected, and the initial shift operation is then performed based on that selected predetermined number of contiguous bit positions.

Hence, purely by way of example, the coarse shifting circuitry may determine whether the first 16 bits, first 32 bits, and first 48 bits of a binary number have said predetermined bit value (for example a logic 0 value). In the event that it is found that that is the case for multiple of those tested numbers of contiguous bit positions, then the largest one is chosen and the left shift is performed accordingly. Hence, in the above example, if it is found that the most significant 16 bits and the most significant 32 bits of the binary number are all at a logic 0 value, but that is not the case for the first 48 most significant bits, then the first 32 bits will be selected, and a 32-bit shift operation will be performed to remove those 32 leading 0 values.

Subsequently, once the actual count value is available, any fine shifting required to left shift any remaining logic 0 values out of the binary number can then be performed.

The binary number can take a variety of forms. However, in one embodiment the data processing apparatus further comprises an input configured to receive a floating point number comprising a fraction and an exponent, the binary number being determined from the fraction, and the shift function being performed as part of a normalization operation applied to the floating point number. As discussed earlier, the normalisation operation will also typically involve adjustment to the exponent value to take account of the amount of shifting performed on the binary number determined from the fraction.

In one embodiment, the shift function will be performed if the floating point number is subnormal. For a normal floating point number, such a shift function will not be required, since the most significant bit of the significand will already not have the predetermined bit value (e.g. if the predetermined bit value is a logic 0 value, the most significant bit of the significand will already be a logic 1 value for a normal floating point operand).

In one embodiment, the floating point number is determined to be subnormal if the exponent has a predetermined exponent value, and the coarse shifting circuitry is configured to receive the exponent and to cause the initial shift operation to perform no shift on the binary number if the exponent does not have said predetermined exponent value. Hence, the operation of the coarse shifting circuitry can effectively be gated so that no initial shift operation is performed if the floating point number is not subnormal. Similarly, the fine shifting circuitry can be arranged to perform no shift on the output from the coarse shifting circuitry in such circumstances.

In one particular embodiment, the exponent has said predetermined exponent value if each bit position of the exponent has the predetermined bit value. In one particular embodiment the predetermined bit value is a logic 0 value, and hence in situations where the exponent is all 0s, this indicates that the floating point number is subnormal.

There are a number of ways in which the operation of the coarse shifting circuitry can be gated so as only to perform a non-zero left shift operation if the floating point number is subnormal. In situations where the exponent value of each bit position of the exponent has the predetermined bit value, then the coarse shifting circuitry may be configured to receive as an input value the fraction prepended with the exponent, and the coarse shifting circuitry is configured to evaluate the input value, starting from a first end comprising the exponent, in order to determine, for said at least one predetermined number of contiguous bit positions, whether said predetermined number of contiguous bit positions within the binary number has said predetermined bit value. Since the exponent is placed at the first end of the input value, and every bit of the exponent will be at the predetermined bit value if the floating point number is subnormal, it follows that if any of the bit positions in the exponent are not at the predetermined bit value, this can be detected by analysis of the input value, and used to ensure that no shift is performed in respect of the binary number by the coarse shifting circuitry in that instance.

In one particular embodiment, for each of said at least one predetermined number of contiguous bit positions within the binary number, a corresponding predetermined number of contiguous bit positions within the input value is determined, and the coarse shifting circuitry is configured to evaluate whether that corresponding predetermined number of contiguous bit positions within the input value has said predetermined bit value. In effect, the corresponding predetermined number of contiguous bit positions within the input value will take account of the number of bit positions formed by the exponent value, and hence will be an increased number of contiguous bit positions when compared with the predetermined number of contiguous bit positions within the binary number. However, once that adjustment has been made, then testing can be performed directly on the corresponding predetermined number of contiguous bit positions within the input value, this testing also directly incorporating a determination of whether the floating point number is subnormal since the number will only be subnormal if all of the bits of the exponent are at the predetermined bit value.

It will be appreciated that, as a result, no determined corresponding predetermined number of contiguous bit positions within the input value will have the predetermined bit value if the floating point number is not subnormal, since in that event at least one bit of the exponent will not be at the predetermined bit value.

The binary number can be formed in a variety of ways. However, in one embodiment the binary number comprises the predetermined bit value in a first bit position at the first end, followed by said fraction. Accordingly, in this embodiment the binary number directly represents the significand of the floating point number in situations where the floating point number is subnormal.

In one embodiment, the data processing apparatus further comprises exponent computation circuitry configured to adjust the exponent in dependence on the count value.

In one embodiment, the shift function is performed if the floating point number is subnormal, and the count value is set to a predetermined count value if the floating point number is not subnormal, the exponent computation circuitry being configured not to adjust the exponent if the count value has said predetermined count value.

In one embodiment, the fine shifting circuitry can be configured in a similar way, such that in response to the count value having the predetermined count value, it causes the further shift operation to perform no shift on the intermediate binary number.

The predetermined bit value is one embodiment a logic 0 value, but in an alternative embodiment may be a logic 1 value.

Further, in one embodiment the first end of the binary number is the most significant bit position of the binary number. However, in an alternative embodiment the first end may be the least significant bit position of the binary number.

Viewed from a second aspect, the present invention provides a method of operating a data processing apparatus to perform a shift function on a binary number, comprising: determining a number of contiguous bit positions in the binary number having a predetermined bit value, starting from a first end of the binary number, and generating a count value indicative of said number of contiguous bit positions; employing coarse shifting circuitry to determine, for at least one predetermined number of contiguous bit positions, whether said predetermined number of contiguous bit positions within the binary number has said predetermined bit value, starting from said first end, and to perform an initial shift operation on the binary number based on said determination in order to produce an intermediate binary number, the initial shift operation being performed in parallel with the determination of the count value; and employing fine shifting circuitry to perform a further shift operation on the intermediate binary number, based on the generated count value, in order to produce a result binary number.

Viewed from a third aspect, the present invention provides a data processing apparatus for performing a shift function on a binary number, comprising: count determination means for determining a number of contiguous bit positions in the binary number having a predetermined bit value, starting from a first end of the binary number, and for outputting a count value indicative of said number of contiguous bit positions; coarse shifting means for determining, for at least one predetermined number of contiguous bit positions, whether said predetermined number of contiguous bit positions within the binary number has said predetermined bit value, starting from said first end, and for performing an initial shift operation on the binary number based on said determination in order to produce an intermediate binary number, said coarse shifting means for operating in parallel with said count determination means; and fine shifting means for performing a further shift operation on the intermediate binary number, based on the count value output by the count determination means, in order to produce a result binary number.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
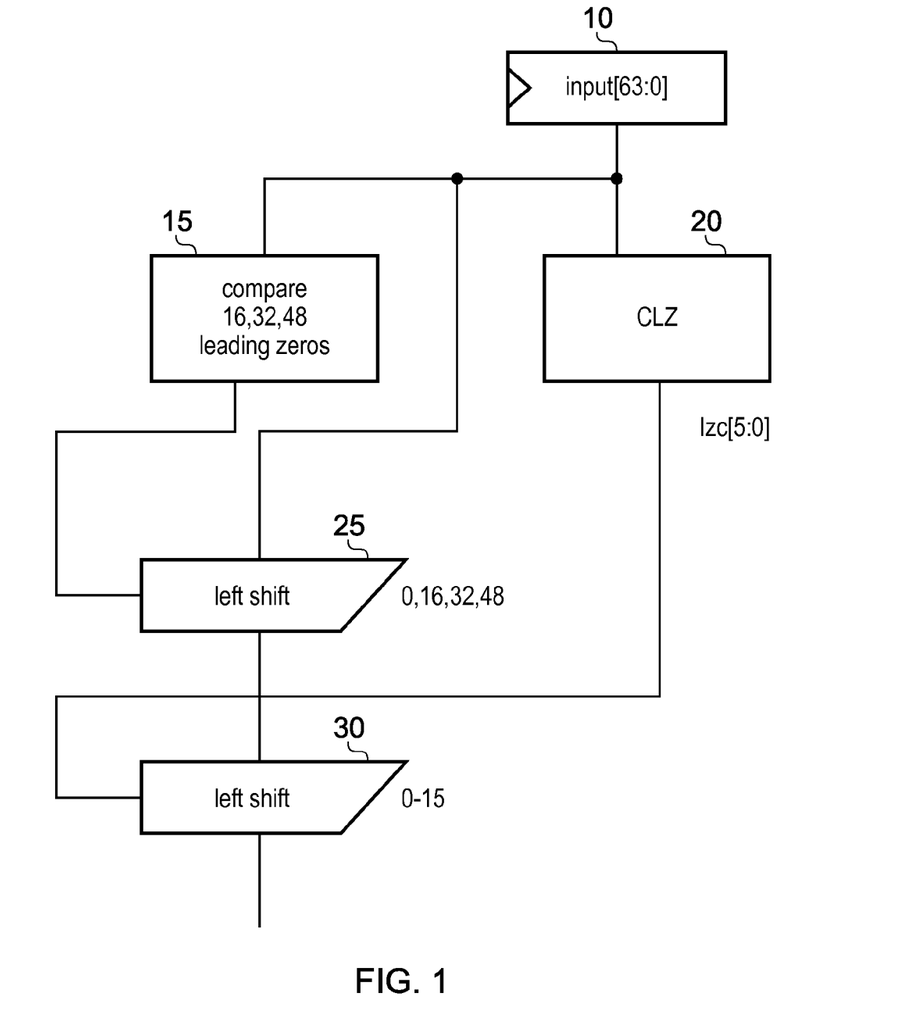
FIG. 1 is a block diagram of a data processing apparatus in accordance with one embodiment.

FIG. 1 is a block diagram of a data processing apparatus in accordance with a first embodiment. An input binary number is received in register 10, and in this example is assumed to be a 64 bit binary number. It will be appreciated that there is no requirement for the binary number to be this size, and that the general teaching of the described embodiment could be applied to a variety of different sized binary numbers. The binary number is routed in parallel to the count-leading zero (CLZ) circuit 20 and to coarse shifting circuitry 15, 25. The CLZ circuitry 20 counts the number of leading 0s in the binary number that precede the highest order 1 in that number, and outputs a leading zero count (LZC). Due to the binary number in this example being a 64 bit number, then the LZC value will be 6 bits in size.

Comparison circuitry 15 within the coarse shifting circuitry 15,25 considers at least one predetermined number of contiguous bit positions within the binary number, to determine whether that predetermined number of contiguous bit positions contains all zeros. In one embodiment this can be achieved by comparing the value taken from the predetermined number of contiguous bit positions of the binary number with an all zeros value to detect if there is a match. In the example shown, three different predetermined numbers of contiguous bit positions are subjected to such a comparison, in particular the most significant 16 bits, the most significant 32 bits and the most significant 48 bits. Each of those sequences of contiguous bit positions are compared with all zeros to determine if there is a match. In the presence of there being matches for multiple of the predetermined numbers of contiguous bit positions, then the one that represents the largest number of contiguous bit positions is selected. Accordingly, by way of example, if it is determined that the 16 most significant contiguous bit positions are all zero, the 32 most significant contiguous bit positions are all zero, but the most significant 48 contiguous bit positions are not, then the 32 contiguous bit positions are selected.

A control signal is then generated by the comparison circuitry 15 based on the results of the above described comparisons. For the specific example mentioned above, a control signal would be issued identifying to the left shift circuitry 25 that a 32 bit left shift should be performed. In other situations, it will be appreciated that the control signal may identify a 16 bit left shift, or a 48 bit left shift. Further, if no matches were detected during the comparison process performed by the comparison circuitry 15, then a control signal will be issued to the left shift circuitry 25 to cause it to perform a zero bit left shift, i.e. no shift.

As shown in FIG. 1, the left shift circuitry 25 receives the input binary number from the register 10, and applies an initial shift operation based on the control signal received from the comparison circuitry 15 in order to produce an intermediate binary number which is then forwarded to fine shifting circuitry 30 controlled by the LZC value output from the CLZ circuit 20.

Since coarse shifting has already been applied by the coarse shifting circuitry 15, 25, only the least significant four bits of the LZC value need to be used to generate a control signal for the fine shifting circuitry 30, the fine shifting circuitry performing a further left shift between zero bits and 15 bits dependent on the value of those least significant four bits of the LZC value. The output from the fine shifting circuitry is then a result binary number.

As can be seen from FIG. 1, since the coarse shifting circuitry operates in parallel with the CLZ circuitry 20, there is no need to await the generation of the LZC count from the CLZ circuitry 20 before beginning the required shift function. Instead, a portion of the required shift function can be performed in parallel whilst waiting for the LZC value to be generated, with fine shifting circuitry then performing any additional fine shifting required to produce the required result binary number. This can provide improved performance when shifting a binary number, whilst still producing an LZC value that is available for use by other components within the system.

There are many situations in data processing systems where it is necessary to perform a shift function on a binary number. One particular example is when processing floating point numbers, and in particular when handling subnormal floating point numbers, which often require normalising before other operations such as divide operations, square root operations, multiply operations, etc are performed on those floating point numbers. Normalisation of a subnormal floating point number will typically require the significand to be left shifted until a leading one is present in the most significant bit position, and for the exponent to then be adjusted accordingly to take account of the amount of left shift applied to the significand. Before discussing an embodiment used to perform a left shift operation on floating point numbers, a brief summary of floating point numbers and how they are represented within a register or memory is provided below.

In floating point representation, numbers are represented using a sign bit S, exponent bits E and fraction bits F. A significand is a number 1.F or 0.F, depending on the value of the exponent E, namely 0.F if E is zero, and 1.F otherwise. The integer part of the significand (0. or 1.) is not explicitly stored in the IEEE-754 Standard, but needs to be taken into account when determining whether normalization is required. The sign bit represents whether the floating point number is positive or negative, the significand represents the significant digits of the floating point number, and the exponent represents the position of the radix point (also known as a binary point) relative to the significand. By varying the value of the exponent, the radix point can "float" left and right within the significand. This means that for a predetermined number of bits, a floating point representation can represent a wider range of numbers than a fixed point representation (in which the radix point has a fixed location within the significand). However, the extra range is achieved at the expense of reduced precision since some of the bits are used to store the exponent. Sometimes, a floating point arithmetic operation generates a result with more significant bits than the number of bits used for the significand. If this happens then the result is rounded to a value that can be represented using the available number of significant bits.

Figure 2A:
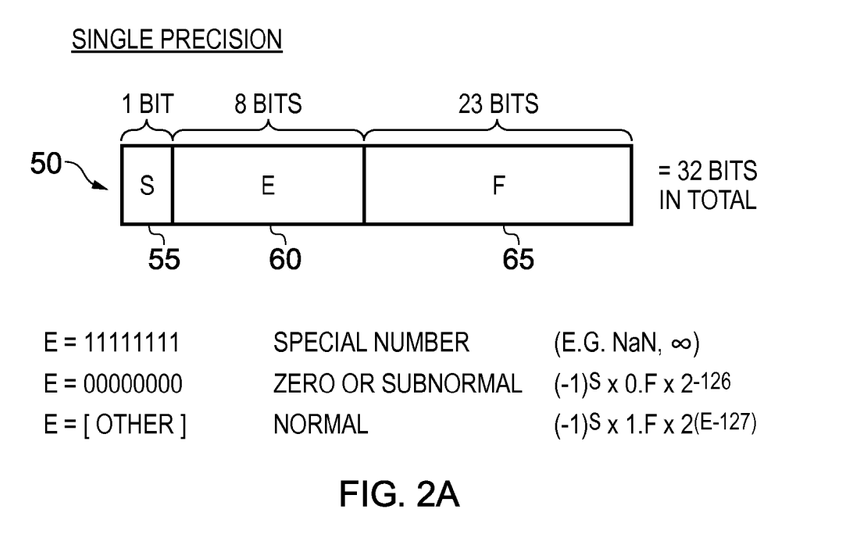
FIGS. 2A and 2B schematically illustrate single precision floating point numbers and double precision floating point numbers, respectively.

FIGS. 2A and 2B show how floating point numbers are stored within a register or memory. In a single precision representation as shown in FIG. 2A, 32 bits are used to store the floating point number. One bit is used as the sign bit S, eight bits are used to store the exponent E, and 23 bits are used to store the fractional portion F of the significand. For normal values, the 23 bits of the fractional portion F, together with an implied bit having a value of one, make up a 24-bit significand 1.F. The radix point is initially assumed to be placed between the implied bit and the 23 stored bits of the significand. The stored exponent E is biased by a fixed value 127 such that in the represented floating point number the radix point is shifted left from its initial position by E-127 places if E-127 is negative (e.g. if E-127=-2 then a significand of 1.01 represents 0.0101), or right from its initial position by E-127 places if E-127 is positive (e.g. if E-127=2 then a significand of 1.01 represents 101). The bias is used to make it simpler to compare exponents of two floating point values as then both negative and positive shifts of the radix point can be represented by a positive value of the stored exponent E. As shown in FIG. 2A, the stored representation S[31], E[30:23], F[22:0] represents a number with the value $(-1)^S*1.F[22:0] *2^{(E-127)}$. A single-precision floating point number in this form is considered to be "normal". If a calculated floating point value is not normal (for example, it has been generated with the radix point at a position other than between the left-most two bits of the significand), then it is normalized by shifting the significand left or right and adjusting the exponent accordingly until the number is of the form $(-1)^S*1.F[22:0] *2^{E-127}$.

Figure 2B:
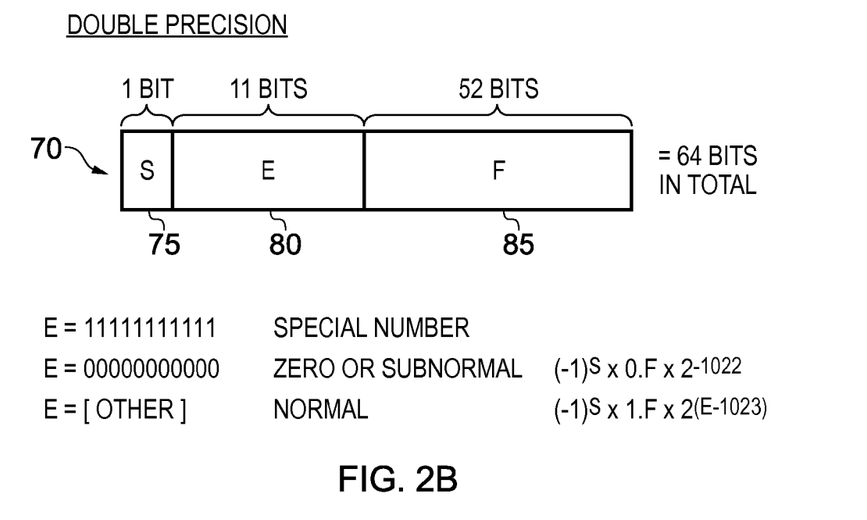

A double precision format is also provided as shown in FIG. 2B, in which the significand and exponent are represented using 64 stored bits. The 64 stored bits include one sign bit, an 11-bit exponent and the 52-bit fractional portion F of a 53-bit significand 1.F. In double precision format the exponent E is biased by a value of 1023. Thus, in the double precision format a stored representation S[63], E[62:52], F[51:0] represents a floating point value $(-1)^S*1.F[51:0] * 2^{E-1023}$.

As well as normal floating point values, the floating point representation can also represent other quantities. If the exponent E for a value has all its bits set to 1 then this represents a special number, such as infinity and "not a number" (NaN) values, which are results which cannot be represented using a real number, such as the square root of a negative number, the division 0/0, the result of a calculation using infinity and the result of a function applied to a value outside its defined range (e.g. the inverse sine or cosine of number less than −1 or greater than +1). When the exponent has all its bits equal to 1, infinity is typically represented by the significand bits F all being equal to 0, while other NaN values are represented by non-zero values for the significand. Techniques for handling infinity and NaN values are well known and any prior art technique can be used. Therefore the handling of these numbers will not be discussed in detail herein.

When the exponent E has its bits all equal to zero then this represents either zero or a subnormal number. The floating point value is equal to zero if its significand bits F are all zero. If any bit of the significand is equal to 1 then the number is a subnormal number. A subnormal number has its implicit bit of the significand equal to zero instead of one as in the case of normal numbers. This allows values smaller than the smallest number represented using a normal number. For example, in the single precision case the smallest value representable using a normal number is $1.0*2^{-126}$, while if a subnormal number is used then the smallest representable value is $2^{-149}$ ($0.00000000000000000000001*2^{-126}$), since the leading one can now be in the least significant bit of the 23-bit fraction F.

Figure 3:
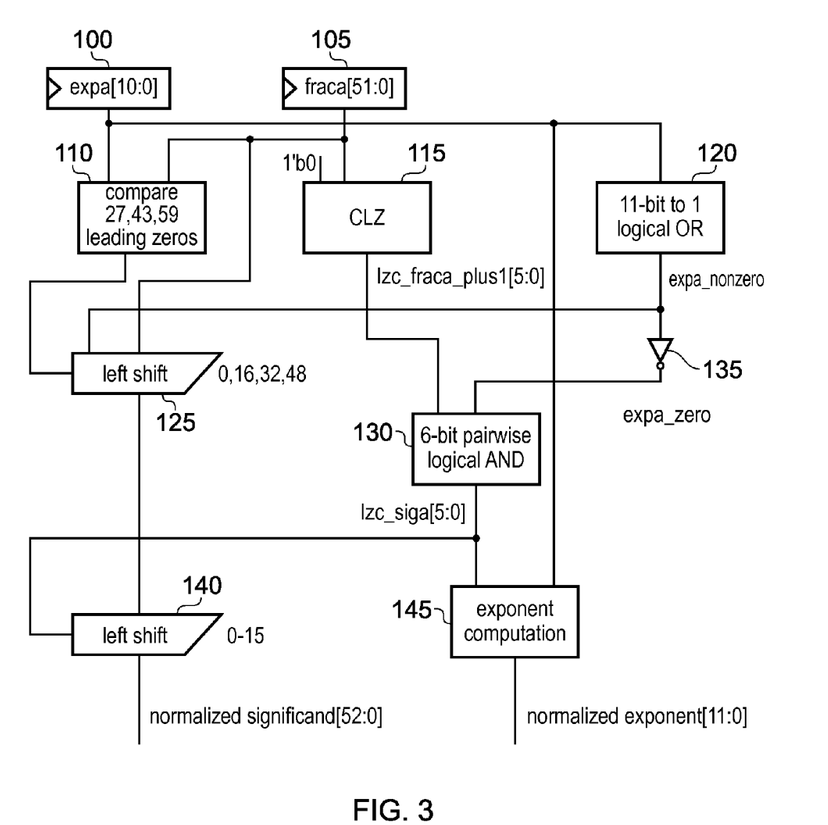
FIG. 3 is a block diagram of a data processing apparatus in accordance with an alternative embodiment.

As discussed earlier, when handling subnormal numbers, it is often necessary to normalise the subnormal number before applying further processing operations to the number, and this will require a left shift operation to be applied to the significand of the subnormal number. FIG. 3 is a block diagram illustrating how the techniques of one embodiment can be used to improve the speed of the normalisation operation, and in particular the speed of the shift function that needs to be performed in respect of the significand. For the purposes of FIG. 3, application of the technique to the earlier described double precision format will be described, but it will be appreciated that the present technique could also be applied to the single precision format, or indeed to any other floating point format which uses different numbers of bits or different bias values for the floating point representation.

As shown in FIG. 3, the exponent is stored within the input register 100 and the fraction is stored within the input register 105. The fraction is prepended with a logic zero value and sent to the CLZ circuit 115. Since the input to the CLZ circuit 115 has been prepended with a logic zero value, it will produce the correct leading zero count if the number turns out to be subnormal. This LZC count is generated and output to the 6-bit pair wise logical AND circuit 130, whose function will be described later.

Meanwhile, in parallel with the operation of the CLZ circuit 115, the coarse shifting circuitry formed by the components 110, 125 is provided with an input value formed by the exponent being prepended to the fraction in order to make a 63-bit input value for the comparison function performed within the circuitry 110. As discussed earlier, if the input floating point operand is subnormal, all bits of the exponent will be zero. Hence, the predetermined number of contiguous bits that is evaluated by the comparison block 110 is adjusted relative to that discussed earlier in FIG. 1, to take account of the presence of the exponent bits. Hence, considering the earlier example of FIG. 1 where the first 16 bits, 32 bits and 48 bits of the binary number were evaluated, in this case the first 27 bits, 43 bits and 59 bits of the input value provided to the comparison circuitry 115 are evaluated, in order to determine whether any of those predetermined number of contiguous bits are all zeros.

As before, if it is found that multiple of those predetermined number of contiguous bit positions are all zero, then the largest one is selected in order to determine the control signal sent to the left shift circuitry 125. In particular, if the leading 27 bits of the input value to the comparison block 110 are all zeros, then this will cause a 16 bit left shift 125 to be applied by the left shift circuitry 125 to its received input, if the most significant 43 bits of the input value to the comparison stage 110 are all zeros, this will cause a 32 bit left shift to be applied, and if the most significant 59 bits of the input value to the comparison block 110 are all zeros, this will cause a 48 bit left shift to be applied. In one embodiment, all of the various comparisons performed within the comparison block 110 are performed in parallel. However, in an alternative embodiment, those comparisons could be performed serially, and in one such embodiment the first comparison performed would be in respect of the largest number of predetermined contiguous bit positions, since if it is determined that all of those bits are zeros, no further comparisons are needed, and the control signal can be generated straight away.

As shown in FIG. 3, the significand input to the left shift circuitry 125 is formed by the fraction read out of the register 105, prepended by a bit value expa_nonzero. This bit value is generated by the 11-bit to one logical OR block 120, which receives the exponent value and performs a logical OR operation on it in order to generate a single bit output. It will be appreciated that the single bit output will be at a logic zero value if all of the exponent bits are at a logic zero value, or will be at a logic one value otherwise. Hence, for a subnormal number, a logic zero value will be prepended to form a significand input to the left shift circuitry 125, and then a left shift operation will be performed dependent on the control signal from the comparison block 110. For a normal number, a logic one value will be prepended to the fraction to form the significand, and no left shift will be performed, since none of the first 27, 43 or 59 most significant bits of the input to the comparison block can be all zeros, given that at least one bit of the exponent will be non-zero for a normal number.

The intermediate value generated by the left shift circuitry 125 is then forwarded to the fine shifting circuitry 140.

As mentioned earlier, the LZC value produced by the CLZ circuit 115 is forwarded to the 6-bit pair wise logical AND circuit 130 which also receives as the other input to each of the AND gates a control signal issued by the inverter 135. For a subnormal number, it will be appreciated that this input will be set to one, and accordingly will cause the LZC value to be propagated to the output of the circuitry 130. However, for a normal number, the output from the logical OR circuitry 120 will be at a logic one level, causing the output from the inverter 135 to be at a logic zero level, hence causing the output of the logical AND circuitry 130 to be set to all zero.

Accordingly, it will be seen that for a normal number, this will cause the fine shifting circuitry to perform no left shift operation. However, for a subnormal number, the LZC value will be used to control the left shift operation. As discussed earlier, only the least significant four bits of the LZC value are required for this purpose, given that coarse shifting has already been applied by the components 110, 125.

The original exponent is provided to the exponent computation block 145, which also receives the LZC value output by the circuitry 130. For a normal floating point number, this will cause no adjustment to be made to the exponent, but for a subnormal number this will cause the exponent to be adjusted dependent on the LZC value. For this adjustment purpose, all six bits of the LZC value are used, in order to generate an exponent for the normalised floating point number.

As shown in FIG. 3, through use of the circuitry shown therein, a normalised significand is output by the left shift circuitry 140, and a normalised exponent is output by the exponent computation circuitry 145. This circuitry enables a subnormal floating point operand to be normalised in a fast and efficient manner. In particular, the shift function can begin to be performed before the LZC value is generated. The CLZ circuit can take any desired form, and those skilled in the art will understand that there are a number of known techniques for implementing such a CLZ circuit. Currently, the fastest known CLZ circuits produce the entire LZC value all at once, and such circuits can be used in this embodiment in order to generate the LZC value propagated on to the circuitry 130, and from there on to the exponent computation block 145, allowing any exponent adjustment to be performed as quickly as possible.

As will be apparent from the earlier discussion, if the input floating point operand is already a normal floating point operand, then the functionality of the circuitry is effectively gated so that no left shift is performed on the significand, and no adjustment is made to the exponent. Finally, it will be noted that a floating point number representing a value zero will also be treated in the same way as a subnormal number by the circuitry of FIG. 3. However, as will be appreciated by those skilled in the art, there are a number of known techniques for detecting the presence of a zero floating point number, and those techniques can be used to capture and handle such floating point zero values, either before, or after, the operation of the circuitry of FIG. 3.

Figure 4A:
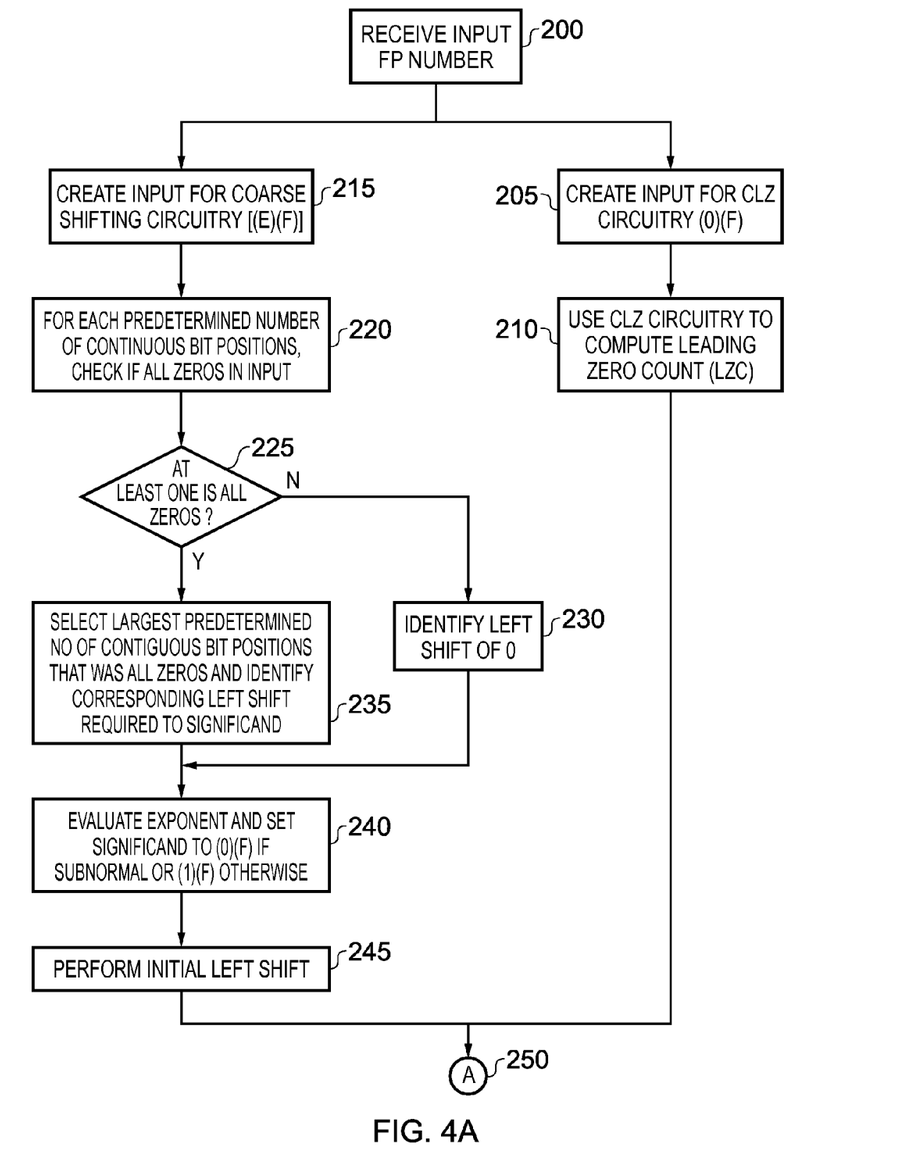
FIGS. 4A and 4B are flow diagrams illustrating the operation of the circuitry of FIG. 3 in accordance with one embodiment.
Figure 4B:
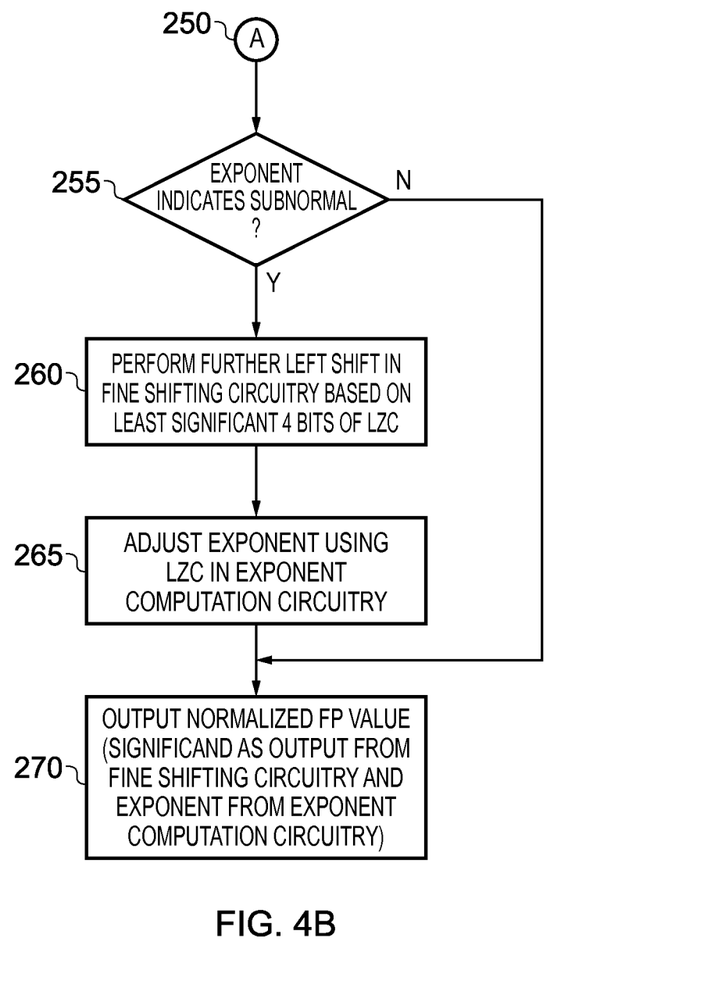

FIGS. 4A and 4B are flow diagrams illustrating the operation of the circuitry of FIG. 3 in accordance with one embodiment. At step 200 the input floating point number is received. At step 205, the input for the CLZ circuitry 115 is created by prepending the fraction part of the received floating point number with a logic zero value. Thereafter, at step 210, the CLZ circuitry 115 is used to compute the leading zero count (LZC) value.

Whilst the CLZ circuitry is being used to compute the LZC value, an input for the coarse shifting circuitry is created at step 215 by prepending the fraction with the exponent of the floating point number, whereafter that input value is then routed to the comparison block 110 at step 220, where for each predetermined number of contiguous bit positions it is determined if there are all zeros in the corresponding part of the input determined at step 215. As mentioned previously when discussing FIG. 3, step 220 can be performed in parallel for each of the various predetermined numbers of contiguous bit positions, or can be performed sequentially, in which event the largest predetermined number of contiguous bit positions would typically be considered first, and further checks would only be necessary if it was determined that that largest number of contiguous bit positions was not all zeros.

At step 225, it is determined whether, for at least one of the predetermined number of contiguous bit positions checked, that predetermined number of contiguous bit positions was found to be all zero. It not, then at step 230 a control signal is generated to identify a left shift of zero. Otherwise, at step 235, the largest predetermined number of contiguous bit positions that was all zeros is selected, and a corresponding left shift required to the significand is identified.

At step 240, the exponent is evaluated and the significand is set equal to the fraction prepended with a logic zero value if the exponent indicates that the floating point input is subnormal, or is set to the fraction prepended with a logic one value otherwise. Whilst step 240 is shown as occurring sequentially following step 235, it will be appreciated from FIG. 3 that in one embodiment step 240 can actually be performed in parallel with the operation of the CLZ circuitry and the coarse shift circuitry.

At step 245, an initial left shift is performed on the significand calculated at step 240, based on the left shift amount determined at steps 230, 235. Thereafter, the process proceeds to point A 250, at which point the LZC value is also received from the CLZ circuitry.

As shown in FIG. 4B, the process then proceeds to step 255, where it is determined whether the exponent indicates that the floating point number is subnormal. If so, then a further left shift is performed at step 260 in the fine shifting circuitry 140, based on some of the least significant bits of the LZC value (for the example of FIG. 3 this being the least significant four bits of the LZC value). Further, at step 265, the exponent is adjusted using the LZC value, in the exponent computation circuitry 145. As is apparent from FIG. 3, in one embodiment steps 260 and 265 can be performed in parallel.

Thereafter at step 270, the normalised floating point value is output, formed by the significand as output from the fine shifting circuitry, and the exponent as output from the exponent computation circuitry 145.

If at step 255 it was determined that the exponent was not subnormal, then steps 260, 265 are bypassed, as a result of which no fine shifting is performed and no exponent adjustment is made. Further, as will be apparent from the earlier discussed step 230, in such a situation no coarse shifting will be performed either, and accordingly the normalised floating point value output at step 270 will be the input floating point number received at step 200.

The following example illustrates how the circuitry of FIG. 3 is used for a specific example of a subnormal floating point number.
input exp prepended to fraction=000_0000_0000_0000_0000_0000_0000_0000_0000_0000_0001_0110_0000_0111_010 0
(where the first 11 bits are the exponent, and are all zeros indicating a subnormal value, and the remaining bits are the fraction)

Operation of the Coarse Shifter
This assesses the leading 27, 43, and 59 bits of the above value and determines:
000_0000_0000_0000_0000_0000_0000 27 leading zeros—true 000_0000_0000_0000_0000_0000_0000_0000_0000_0000_0000 43 leading zeros—true
The 59 leading zero condition is false.
Accordingly it is determined that a 32-bit left shift of the significand (also referred to as the mantissa) is required. The significand (formed by the fraction prepended with a 0) is:
0_0000_0000_0000_0000_0000_0000_0000_0000_0001_0110_0000_0111_0100
and accordingly the output of the coarse shifter (and input to the fine shifter) after left shifting the significand by 32 bits is:
0_0001_0110_0000_0111_0100 significand after 32-bit left shift
Operation of CLZ Circuitry
The fraction is:
0000_0000_0000_0000_0000_0000_0000_0000_0001_0110_0000_0111_0100
The CLZ analysis is performed on 0 prepended to the fraction, i.e.
0_0000_0000_0000_0000_0000_0000_0000_0000_0001_0110_0000_0111_0100
There are 36 leading zeros, so the binary leading zero count is lzc[5:0]=10_0100
The exponent is zero, so the lzc value is kept as is (not zeroed out) when analysed by the circuitry 130.
Operation of the Fine Shifter
Fine shifting is performed based on the last 4 bits of lzc: lzc[3:0]=0100
The input is:
0_0001_0110_0000_0111_0100 (output of coarse shifter)
The output is:
1_0110_0000_0111_0100

As will be apparent from the above described embodiments, the described techniques provide increased performance in the implementation of a shift function on a binary number, whilst still allowing the leading zero count to be captured separately, and used by other components as required. One particular practical implementation for such a mechanism is in association with the performance of normalisation of subnormal floating point numbers, as may be required as an initial step in a number of floating point computations, such as divide, square root, multiply, etc.

Whilst the technique is described in connection with the detection of the number of leading zeros, and a corresponding left shift applied to the binary number, the technique could also be applied to the detection of leading ones, or indeed to the detection of trailing strings of ones or zeros, with shifting being performed more quickly due to the two stage shifting approach of the described embodiments, where an initial shifting is performed in parallel with the detection of the leading/trailing zero/one amount.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus for performing a shift function on a binary number, comprising:

count determination circuitry configured to determine a number of contiguous bit positions in the binary number having a predetermined bit value, and to output a count value indicative of said number of contiguous bit positions;

coarse shifting circuitry configured to determine, for at least one predetermined number of contiguous bit positions, whether said predetermined number of contiguous bit positions within the binary number has said predetermined bit value, and to perform an initial shift operation on the binary number based on said determination in order to produce an intermediate binary number, said coarse shifting circuitry operating in parallel with said count determination circuitry; and fine shifting circuitry configured to perform a further shift operation on the intermediate binary number, based on the count value output by the count determination circuitry, in order to produce a result binary number, wherein said at least one predetermined number of contiguous bit positions comprises a set of multiple different predetermined numbers of contiguous bit positions, and the coarse shifting circuitry is configured, if a plurality of said multiple different predetermined numbers of contiguous bit positions have said predetermined bit value, to select a largest of the predetermined numbers of contiguous bit positions from said plurality, and to perform the initial shift operation based on said selected predetermined number of contiguous bit positions.

2. A data processing apparatus as claimed in claim 1, wherein the count determination circuitry is configured to determine the number of contiguous bit positions in the binary number having said predetermined bit value, starting from a first end of the binary number, and the coarse shifting circuitry is configured to determine whether said predetermined number of contiguous bit positions within the binary number has said predetermined bit value, starting from said first end.

3. A data processing apparatus as claimed in claim 1, further comprising:
an input configured to receive a floating point number comprising a fraction and an exponent, the binary number being determined from said fraction, and said shift function being performed as part of a normalization operation applied to said floating point number.

4. A data processing apparatus as claimed in claim 3, wherein said shift function is performed if said floating point number is subnormal.

5. A data processing apparatus as claimed in claim 4, wherein the floating point number is determined to be subnormal if the exponent has a predetermined exponent value, and the coarse shifting circuitry is configured to receive the exponent and to cause the initial shift operation to perform no shift on the binary number if the exponent does not have said predetermined exponent value.

6. A data processing apparatus as claimed in claim 5, wherein the exponent has said predetermined exponent value if each bit position of said exponent has said predetermined bit value.

7. A data processing apparatus as claimed in claim 2, further comprising:
an input configured to receive a floating point number comprising a fraction and an exponent, the binary number being determined from said fraction, and said shift function being performed as part of a normalization operation applied to said floating point number;
wherein said binary number comprises said predetermined bit value in a first bit position at said first end, followed by said fraction.

8. A data processing apparatus as claimed in claim 1, further comprising exponent computation circuitry configured to adjust the exponent in dependence on the count value.

9. A data processing apparatus as claimed in claim 8, wherein:
said shift function is performed if said floating point number is subnormal;
the count value is set to a predetermined count value if the floating point number is not subnormal, the exponent computation circuitry being configured not to adjust the exponent if the count value has said predetermined count value.

10. A data processing apparatus as claimed in claim 1, wherein:
said shift function is performed if said floating point number is subnormal;
the count value is set to a predetermined count value if the floating point number is not subnormal, and the fine shifting circuitry is configured, responsive to the count value having said predetermined count value, to cause the further shift operation to perform no shift on the intermediate binary number.

11. A data processing apparatus as claimed in claim 1, wherein said predetermined bit value is a logic zero value.

12. A data processing apparatus as claimed in claim 2, wherein said first end is a most significant bit position of said binary number.

13. A data processing apparatus for performing a shift function on a binary number, comprising:
count determination circuitry configured to determine a number of contiguous bit positions in the binary number having a predetermined bit value, and to output a count value indicative of said number of contiguous bit positions;
coarse shifting circuitry configured to determine, for at least one predetermined number of contiguous bit positions, whether said predetermined number of contiguous bit positions within the binary number has said predetermined bit value, and to perform an initial shift operation on the binary number based on said determination in order to produce an intermediate binary number, said coarse shifting circuitry operating in parallel with said count determination circuitry;
fine shifting circuitry configured to perform a further shift operation on the intermediate binary number, based on the count value output by the count determination circuitry, in order to produce a result binary number; and
an input configured to receive a floating point number comprising a fraction and an exponent, the binary number being determined from said fraction, and said shift function being performed as part of a normalization operation applied to said floating point number;
wherein said shift function is performed if said floating point number is subnormal;
wherein the floating point number is determined to be subnormal if the exponent has a predetermined exponent value, and the coarse shifting circuitry is configured to receive the exponent and to cause the initial shift operation to perform no shift on the binary number if the exponent does not have said predetermined exponent value;

wherein the exponent has said predetermined exponent value if each bit position of said exponent has said predetermined bit value;

wherein the coarse shifting circuitry is configured to receive as an input value the fraction prepended with the exponent, and the coarse shifting circuitry is configured to evaluate said input value, starting from a first end comprising said exponent, in order to determine, for said at least one predetermined number of contiguous bit positions, whether said predetermined number of contiguous bit positions within the binary number has said predetermined bit value.

14. A data processing apparatus as claimed in claim 13, wherein, for each of said at least one predetermined number of contiguous bit positions within the binary number, a corresponding predetermined number of contiguous bit positions within the input value is determined, and the coarse shifting circuitry is configured to evaluate whether that corresponding predetermined number of contiguous bit positions within the input value has said predetermined bit value.

15. A data processing apparatus as claimed in claim 14, wherein no determined corresponding predetermined number of contiguous bit positions within the input value will have said predetermined bit value if the floating point number is not subnormal.

16. A method of operating a data processing apparatus to perform a shift function on a binary number, comprising:

determining a number of contiguous bit positions in the binary number having a predetermined bit value, and generating a count value indicative of said number of contiguous bit positions;

employing coarse shifting circuitry to determine, for at least one predetermined number of contiguous bit positions, whether said predetermined number of contiguous bit positions within the binary number has said predetermined bit value, and to perform an initial shift operation on the binary number based on said determination in order to produce an intermediate binary number, the initial shift operation being performed in parallel with the determination of the count value; and employing fine shifting circuitry to perform a further shift operation on the intermediate binary number, based on the generated count value, in order to produce a result binary number;

wherein said at least one predetermined number of contiguous bit positions comprises a set of multiple different predetermined numbers of contiguous bit positions, and if a plurality of said multiple different predetermined numbers of contiguous bit positions have said predetermined bit value, the coarse shifting circuitry selects a largest of the predetermined numbers of contiguous bit positions from said plurality, and performs the initial shift operation based on said selected predetermined number of contiguous bit positions.

* * * * *